US008681042B2

(12) United States Patent
Martin et al.

(10) Patent No.: US 8,681,042 B2
(45) Date of Patent: Mar. 25, 2014

(54) SYSTEM AND METHOD FOR MULTI-CORRELATION WITH MODULATION-ADAPTED FILTER FOR THE FAST ACQUISITION AND THE TRACKING OF A RADIO NAVIGATION SIGNAL IN THE PRESENCE OF JAMMING

(75) Inventors: Nicolas Martin, Bourg les Valence (FR); Yves Clauzel, Montelimar (FR)

(73) Assignee: Thales, Neuilly sur Seine (FR)

( * ) Notice: Subject to any disclaimer, the term of this patent is extended or adjusted under 35 U.S.C. 154(b) by 344 days.

(21) Appl. No.: 12/993,897

(22) PCT Filed: May 25, 2009

(86) PCT No.: PCT/EP2009/056317
§ 371 (c)(1),
(2), (4) Date: Jul. 4, 2011

(87) PCT Pub. No.: WO2009/141453
PCT Pub. Date: Nov. 26, 2009

(65) Prior Publication Data
US 2011/0254732 A1     Oct. 20, 2011

(30) Foreign Application Priority Data
May 23, 2008    (FR) ....................................... 08 02805

(51) Int. Cl.
*G01S 19/21*     (2010.01)
(52) U.S. Cl.
USPC .................................................. 342/357.59
(58) Field of Classification Search
USPC .................................................. 342/357.59
See application file for complete search history.

(56) References Cited

U.S. PATENT DOCUMENTS

| | | | |
|---|---|---|---|
| 5,495,499 A | | 2/1996 | Fenton et al. |
| 5,897,605 A | * | 4/1999 | Kohli et al. ................... 701/469 |
| 2004/0228314 A1 | * | 11/2004 | Ros et al. ....................... 370/342 |
| 2008/0169980 A1 | * | 7/2008 | Underbrink et al. .......... 342/450 |
| 2009/0104883 A1 | * | 4/2009 | Renard et al. .............. 455/234.1 |
| 2009/0259707 A1 | | 10/2009 | Martin et al. |
| 2010/0013706 A1 | * | 1/2010 | Sun .......................... 342/357.15 |

FOREIGN PATENT DOCUMENTS

| | | |
|---|---|---|
| FR | 2898998 | 9/2007 |
| WO | 0065751 | 11/2000 |

OTHER PUBLICATIONS

Namgoong et al., "GPS Receiver Design for Portable Applications," Acoustic, Speech and Signal Processing, 2000 IEEE Int'l Conf., vol. 6, pp. 3706-3709 (Jun. 5, 2000).

(Continued)

*Primary Examiner* — Harry Liu
(74) *Attorney, Agent, or Firm* — Baker & Hostetler LLP

(57) ABSTRACT

A system for receiving a radionavigation signal, notably in a jammed medium, emitted by a satellite of a satellite positioning system, includes: at least one first multi-correlator and at least one second multi-correlator disposed in parallel and operating respectively at a frequency; filtering means, disposed upstream of said multi-correlators; a delay line, disposed on the branch, between the filtering means and the second multi-correlator; means for sub-sampling at the frequency adapted for sub-sampling the signal transmitted directly and by branching with delay by the filtering means; and demodulation means eliminating the Doppler effect, disposed between the sub-sampling means and the first and second multi-correlators.

10 Claims, 10 Drawing Sheets

(56) References Cited

OTHER PUBLICATIONS

Namgoong et al., "Minimizing Power Consumption in Direct Sequence Spread Spectrum Correlators by Resampling IF Samples—Part II: Implementation Issues," IEEE Trans. on Circ. and Sys. II: Express Briefs, vol. 48, No. 5, pp. 1=11 (May 1, 2001).

Meng et al., "Low-Power GPS Receiver Design," Signal Processing Systems, 1998 IEEE Workshop, pp. 1-10 (Oct. 8, 1998).

* cited by examiner

SYSTEM AND METHOD FOR MULTI-CORRELATION WITH MODULATION-ADAPTED FILTER FOR THE FAST ACQUISITION AND THE TRACKING OF A RADIO NAVIGATION SIGNAL IN THE PRESENCE OF JAMMING

CROSS-REFERENCE TO RELATED APPLICATIONS

This application is a National Stage of International patent application PCT/EP2009/056317, filed on May 25, 2009, which claims priority to foreign French patent application No. FR 08 02805, filed on May 23, 2008, the disclosures of which are incorporated by reference in their entirety.

FIELD OF THE INVENTION

The invention pertains to a system and method for receiving a radionavigation signal, notably in the presence of jamming, for example emitted by a satellite of a satellite positioning system.

BACKGROUND OF THE INVENTION

Satellite positioning systems make it possible to precisely calculate the position of a receiver, for example installed aboard a vehicle or aircraft.

Several radionavigation systems exist, such as GPS, Galileo or Glonass, the best known being GPS (the acronym standing for the expression "Global Positioning System").

For a satellite positioning system receiver, one tries to obtain the shortest possible duration of acquisition of a radionavigation signal. Indeed, when turning on a receiver, the duration of acquisition is the duration for which the positioning information cannot yet be delivered by the receiver.

The manner of operation of the GPS system is recalled succinctly. It consists of a constellation of 28 satellites and of a terrestrial network of earth reference stations. Each satellite orbits at about 22 000 km from the earth with a period of revolution of 12 hours. Each of them emit two signals, one at 1575.452 MHz for civil applications and the other at 1227.6 MHz for reserved access applications. The signal emitted by a satellite consists of a carrier, optionally of a sub-carrier in the case of a BOC or binary offset carrier modulation, modulated by a known spreading code and optionally by unknown data. The satellites all emit on the same frequencies and the signals emitted are differentiated by their code.

These codes generally exhibit a period T, which may be short, for example 1 ms, or very long on the time scale considered, for example a week, but they can also be non-periodic, this being the case for example for encrypted signals. The codes typically consist of a large number of elementary time divisions, also called code "chips" which have a mean duration equal to Tc.

The positioning of the receiver is obtained by measuring the distance between a satellite and the receiver on the basis of the duration of propagation of the signal between this satellite and the receiver. The time offset between the signal emitted by the satellite at a known date and the signal received by the receiver at a date to be determined, corresponds to the duration of propagation sought. In the receiver, a replica of the code emitted is generated locally. The date of reception of the signal is measured by setting the signal received and the local signal in phase; the setting-in-phase criterion corresponds to maximizing the correlation function for the two signals, that is to say to searching for a peak in the results for the correlation between the signal received and the local signal, assumptions of different offset between the signal received and the local signal being considered for each correlation calculation.

The correlation calculations are performed on the basis of the real and imaginary components of the signal received, resulting from a sampling of the analog radionavigation signal performed at a frequency Fe of greater than 2/Tc, Tc being the mean duration of a code chip, according to Shannon's criterion. On output from the antenna of the receiver, the signal is, in a conventional manner, converted to intermediate frequency, filtered, sampled, and then converted to baseband by digital processing, before correlation with a local code of a satellite.

A correlation calculation is based on an assumption made about the date of reception of the signal emitted by the satellite and received at the level of the antenna of the receiver. Correlation calculations are performed for various assumptions corresponding to various reception dates spaced apart by a duration of half a code chip. For a periodic code of period T equal to 1024 chips, this makes it necessary to test up to 2×1024=2048 assumptions, i.e. consequently 2048 correlation calculations to be carried out.

The correlation calculations are performed over an integration interval whose duration Tint may be varied as a function of the a priori predicted signal-to-noise ratio.

Moreover, in this case, the calculation of a correlation between the signal received and the local signal for an assumption regarding the date of reception of the code received corresponds to $T_{int} \cdot F_e$ products between samples of the two signals and then $T_{int} \cdot F_e - 1$ sums of the results of the products. When the duration of a calculation of a correlation equals $D_{Calcul}$, and if the calculations of the 2048 correlations are carried out sequentially, the total duration of the calculation of the correlations then equals $2048 \cdot D_{Calcul}$. This total duration can exceed the ten or so minutes for phase-setting the code of the signal received, that is to say for accessing and using the data produced by the satellite which emits the signal.

For an integration interval of fixed duration, a first solution for reducing the total duration of the calculation of the correlations consists in reducing the duration of a correlation calculation, for example by performing the operations (products and then sums) in parallel rather than performing them in series as described previously. In this way, the total duration of calculation of the correlations is reduced, since the operations are carried out simultaneously. For such purposes, the receivers implement several correlators in parallel.

The standpoint of this solution is adopted hereinafter.

In a certain number of situations, the reduction in the total duration of the calculation of the correlations which is obtained by the first solution presented is not sufficient, this being the case, for example, when the period T of the code is long or when the number of elementary correlations to be performed is multiplied because of a significant number of assumptions to be made about the frequency of the signal to be considered in order to compensate for the Doppler effect.

We recall that the processing of the signal received comprises two phases, an acquisition phase and a tracking phase. The aim of the acquisition phase is to synchronize a code and a carrier, that are generated in the receiver, with the code and the carrier of the signal received from the satellite. This phase is iterative so as to traverse a domain of uncertainty in terms of code and Doppler effect. The aim of the tracking phase is to maintain the best synchronization of the local code and of the phase of the local carrier with the code and the phase of the carrier of the signal received, so as to produce a measurement of the position of the code and of the phase of the carrier for the positioning calculation. This phase consists in closing the code tracking loop or DLL ("Delay Lock Loop") and carrier phase loop or PLL ("Phase Lock Loop").

The signal acquisition time is proportional to the uncertainty in the code, to the integration time of the correlators, and inversely proportional to the number of available correlators.

The uncertainty in the code is related to the period of the code and to the uncertainty in the signal propagation time, i.e. to the uncertainty in the position of the satellite and in that of the antenna of the receiver, as well as to the uncertainty in the clock of the receiver with respect to the system time. The latter uncertainty is predominant notably in the case of signals with non-periodic codes.

The uncertainty in the code is related to the initial conditions and does not depend on the receiver, but is related to the initial conditions, unlike the number of correlators which is a parameter directly influencing the performance of the receiver.

The integration time is inversely proportional to the signal-to-noise ratio. In the presence of jamming the acquisition time can therefore be very long, thus requiring many correlators to maintain an acquisition time that is reasonable from a user's point of view.

The receivers use multi-correlators which make it possible to test several code assumptions at the same time: a bank of correlators using the same local code sequence, but offset by a delay line, is embedded inside a channel dedicated to a satellite.

The multi-correlators also serve for fast reacquisition, which is useful in the presence of intermittent jamming or masking.

The multi-correlators are also used in the tracking phase to maintain the tracking in the presence of jamming, by non-linear filtering techniques.

On the complexity of the multi-correlators, expressed in terms of number of elementary logic operators necessary to embed them in an FPGA or an ASIC, depends the cost and the electrical consumption of the receiver and its performance in terms of acquisition time.

French patent application FR 2 898 998 proposes that the total duration of the calculation of the correlations be reduced by avoiding repeating intermediate calculations which are common from one correlation calculation to another. For such purposes, this application proposes a method for calculating correlations between a first sequence and a second sequence, said first sequence and said second sequence each having a duration $D_{Code}$. The first sequence is extracted from a digital signal comprising a code, said code comprising elementary time divisions, called chips, of a duration $D_{chip}$. The chips are sampled on pulses delivered by a numerically controlled oscillator, or NCO, at the mean frequency $2/D_{chip}$, the second sequence resulting from a sampling at a frequency $F_e$ of an analog signal. The frequency $F_e$ is greater than $2/D_{chip}$. This method comprises a step of aggregating the samples of the second sequence, over consecutive integration intervals of duration equal on average to $D_{chip}/2$, starting at each pulse of the numerically controlled oscillator, so as to determine elementary aggregate results. Furthermore, in an optional manner, the elementary aggregate results may be employed to determine results of calculations of correlations between a first sequence and second sequences, the second sequences being deduced from one another by a time offset of duration $D_{chip}/2$. The document also specifies that the method can comprise, for each second sequence, a step of weighting each elementary aggregate result for the second sequence by the value of the chip of the first sequence at the start of the elementary aggregate, so as to obtain weighted aggregate results, and a step of accumulating the weighted aggregate results.

Such a method pegs the spacing between two successive correlators at $D_{chip}/2$ or Tc/2.

Thus, a spacing between two successive correlators which is pegged at Tc/2 is not very precise for the tracking phase, for which a smaller spacing between two successive correlators is required, to obtain sufficient precision of the measurements. Furthermore, the working frequency at $2F_{code}$ remains significant.

SUMMARY OF THE INVENTION

The present invention is aimed at solving the above-named problems.

According to one aspect of the invention, there is proposed a system for receiving a radionavigation signal, notably in a jammed medium, emitted by a satellite of a satellite positioning system, comprising:

at least one first multi-correlator and at least one second multi-correlator disposed in parallel and operating respectively at a frequency $F_{code}$ generated by a digitally controlled oscillator, the offset between the sequences of correlations of two successive correlators of one and the same multi-correlator being equal to an elementary duration Tc of the spreading code, during which the value of the spreading code is constant;

filtering means, disposed upstream of said multi-correlators, of impulse response substantially equal to the waveform of the signal emitted by the satellite making it possible to perform an aggregate of the samples of the signal received, operating at the sampling frequency $F_e$ of the signal emitted by the satellite for the set of reception channels, and delivering as output a filtered signal destined for the first multi-correlator and destined for the second multi-correlator by branching;

a delay line, disposed on the branch, between said filtering means and said second multi-correlator, comprising a set of delay modules with controlled individual activation/deactivation, disposed in series, a delay module being adapted for causing a delay of a sampling period of the signal emitted by the satellite equal to the inverse of the sampling frequency $F_e$;

means for sub-sampling at the frequency $F_{code}$ adapted for sub-sampling the signal transmitted directly and by branching with delay by said filtering means; and demodulation means for eliminating the Doppler effect, disposed between said sub-sampling means and said first and second multi-correlators.

The invention makes it possible to manage the spacing between two successive correlators belonging respectively to two different multi-correlators. Furthermore the working frequency downstream of the filtering means is reduced to the frequency $F_{code}$ instead of $2 \times F_{code}$.

For example, said filtering means comprise at least one analog filter.

For example, said filtering means comprise at least one digital filter.

According to one embodiment, said digital filter comprises a finite impulse response FIR filter, or an infinite impulse response IIR filter.

Thus the transfer function of the filter is perfectly controlled.

In one embodiment, said filtering means comprise a first anti-interference filter adapted for filtering the interference of the signal received from the satellite, a second sliding-window aggregate filter adapted for performing an aggregate of the samples of the signal received, and means of demodulation at an intermediate frequency FI, for switching to baseband, disposed between said first and second filters.

The functions of the filtering means are thus separated, and the embodiment simplified, notably of the second filter.

According to one embodiment, said second sliding-window aggregate filter comprises an adder, a subtracter, a delay line comprising a number N1 of delay modules disposed in series, a delay module being adapted for causing a delay of a sampling period of the signal emitted by the satellite, the number N1 of delay modules being such that the product of N1 and of said sampling period is substantially equal to said elementary duration Tc of the spreading code. Said second filter comprises, furthermore, a delay module adapted for causing a delay of a sampling period of the signal emitted by the satellite, disposed on a feedback loop from the output of the subtracter to the input of the adder, and N1+1 storage modules respectively associated with the delay modules.

Such an embodiment is simple and of reduced cost.

In one embodiment, said second sliding-window aggregate filter comprises, furthermore, reinitialization means for resetting to zero the values stored in said N1+1 storage modules.

The risk of aggregating errors due to glitches or noise is thus avoided.

According to one embodiment, the system comprises, furthermore, an automatic gain control loop disposed directly at the output of said filtering means.

This makes it possible to limit the number of coding bits at the input of a satellite channel, while benefiting fully from the modulation spreading gain.

In one embodiment, said automatic gain control loop comprises truncation means for truncating the high-order and low-order bits as a function of the power of the signal at the output of said filtering means, and a feedback loop between the output of the truncation means and a multiplier disposed upstream of said truncation means and also receiving as input the output from said filtering means, said feedback loop comprising regulating means for keeping the energy at the output of said truncation means constant.

It is thus possible to manage in an automatic and suitably adapted manner the truncation of the high-order and low-order bits as a function of the power of the signal on output from the filtering, which varies as a function of the jamming.

According to one embodiment, said regulating means comprise power calculation means, a subtracter receiving as input the output signal from said power calculation means and a reference power, means of infinite integration of the output signal of said subtracter, and gain means for applying a gain to the output signal from said means of infinite integration.

According to another aspect of the invention, there is also proposed a method for receiving a radionavigation signal, notably in a jammed medium, emitted by a satellite of a satellite positioning system, in which:

first and second multiple correlation calculations are performed in parallel at a frequency $F_{code}$, the offset between two successive sequences of correlations of one of said first or second multiple correlation calculations being equal to an elementary duration Tc of the spreading code, during which the value of the spreading code is constant;

sliding-window filtering is effected, before the parallel multiple correlation calculations, with an impulse response substantially equal to the waveform of the signal emitted by the satellite making it possible to perform an aggregate of the samples of the signal received, at the sampling frequency $F_e$ of the signal emitted by the satellite and for the set of reception channels, and a filtered signal is delivered as output for the parallel first and second multiple correlation calculations;

a delay equal to half the elementary duration Tc of the spreading code is introduced into the filtered signal for the second multiple correlation calculations; and the Doppler effect is eliminated by demodulation between the filtering and the multiple correlation calculations in parallel.

BRIEF DESCRIPTION OF THE DRAWINGS

The invention will be better understood on studying a few embodiments described by way of wholly non-limiting examples and illustrated by the appended drawings in which.

DETAILED DESCRIPTION

Figure 1:
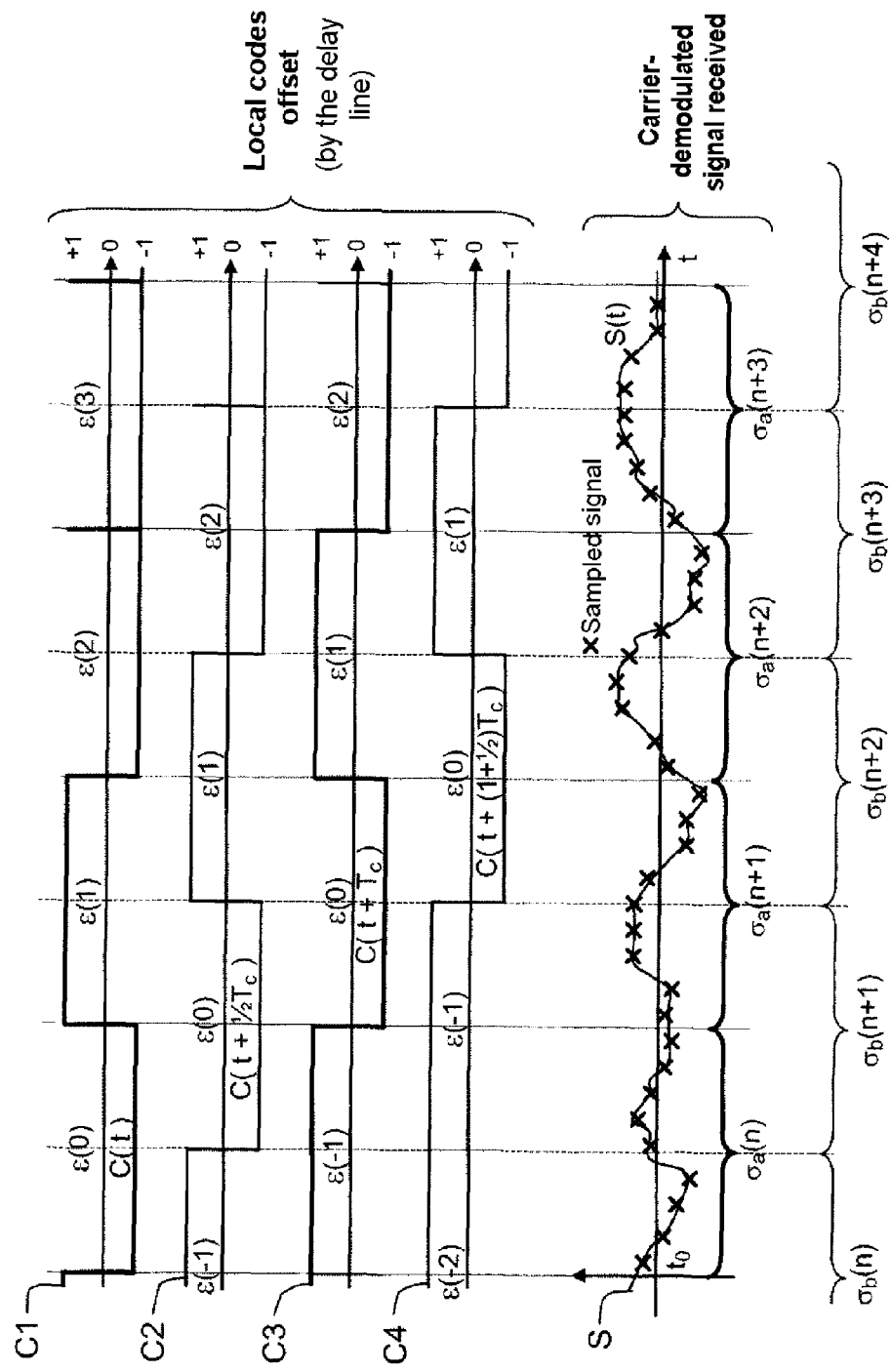
FIG. 1 serves as support for a presentation of the principle, on an example of temporal signals, of the calculation of four correlations, according to one aspect of the invention.

As illustrated in FIG. 1, the even correlators and the odd correlators are distinguished. In each of these sets of correlators, even and odd, sums of samples $\sigma_a$ and $\sigma_b$ performed over the duration of a chip Tc may be calculated once for all the correlators and distributed to the correlators.

The offset of the correlators between the even set and the odd set depends on the offset between the samples of the aggregates $\sigma_a$ and the samples of the aggregates $\sigma_b$. This offset may be chosen arbitrarily.

These aggregates $\sigma_a$ and $\sigma_b$ may be calculated upstream of the channels at the sampling frequency Fe of the signal emitted by the satellite, and then tapped off (sub-sampled), by each channel, at the frequency $F_{code}$ generated locally by the numerically controlled oscillator for the code of the channel. The offset between $\sigma_a$ and $\sigma_b$ may be obtained by a delay line which stores the last aggregates calculated.

In FIG. 1 are represented, along one and the same time axis, four time trends of the pseudo-random code $C1(t)$, $C2(t)$, $C3(t)$, and $C4(t)$ corresponding to four position assumptions for the code received, and a time trend S(t) of the radionavigation signal received by the receiver.

For a correlator of index m, the following relation is satisfied:

$$Cm = \int_{t0}^{t0+LTc} C((t-t0) + m \cdot Tc/2) \cdot S(t) \cdot dt$$

in which:
Cm represents the result of the correlation calculation for correlator m;
L represents the duration of integration of the correlation, in terms of number of chip; and
t0 represents the date or the instant at which the integration interval starts;

For a correlator of even index m, m=2p, the following relation is satisfied:

$$C2p = \int_0^{LTc} C(\tau + p \cdot Tc) \cdot S(t0+\tau) d\tau = \sum_{k=0}^{L-1} \varepsilon(k+p) \cdot \sigma_a(k+n)$$

in which:
τ delay of the code generated locally with respect to the satellite code contained in the signal received, in s.

For a correlator of odd index, m=2p+1, the following relation is satisfied:

$$C2p+1 = \int_0^{LTc} C(\tau + (p+1/2) \cdot Tc) \cdot S(t0+\tau) d\tau$$

$$= \sum_{k=0}^{L-1} \varepsilon(k+p) \cdot \sigma_b(k+n)$$

Figure 2A:
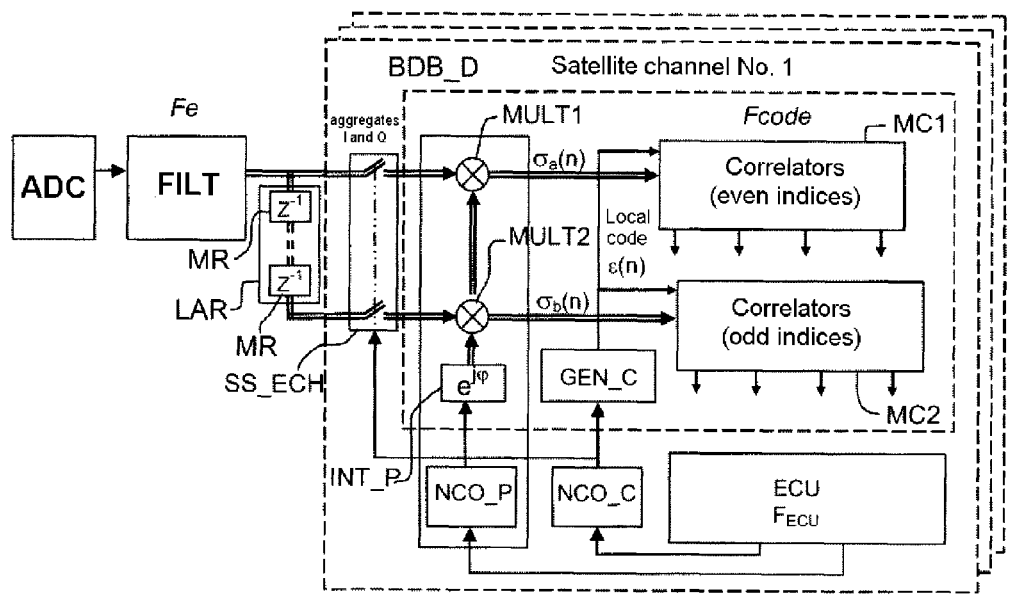
FIGS. 2a and 2b represent an embodiment of a system according to one aspect of the invention.

In FIG. 2a is represented an embodiment of a system according to one aspect of the invention. The analog signal emitted by the satellite is received and digitized by an analog/digital converter ADC, and then transmitted to a sliding-window filtering module FILT, whose impulse response is substantially equal to the waveform of the signal emitted by the satellite, so as to perform an aggregate of the samples of the signal received. The filtering module FILT operates at the sampling frequency $F_e$ of the signal emitted by the satellite for the set of reception channels, for example of the order of 100 MHz. The output signal from the filtering module FILT is transmitted through a first pathway destined for a first multi-correlator MC1, and for a second pathway, branching off from the first, destined for a second multi-correlator MC2. Of course, as a variant, in place of a multi-correlator it is possible to have a set of multi-correlators.

The second pathway comprises a delay line LAR comprising a set of delay modules MR with controlled individual activation/deactivation, disposed in series. A delay module MR is adapted for causing a delay of a sampling period of the signal emitted by the satellite equal to the inverse of the sampling frequency Fe.

A sub-sampling module SS_ECH at the frequency $F_{code}$, for example of the order of 5 MHz, makes it possible to sub-sample the signal transmitted directly and by branching with delay by said filtering means. Furthermore, a demodulation module BDB_D makes it possible to eliminate the Doppler effect of the signals sub-sampled by the sub-sampling module SS_ECH. The output signals from the demodulation module BDB_D, without and with delay, are respectively transmitted to the first and to the second multi-correlators MC1, MC1.

For example, the demodulation module BDB_D comprises a carrier numerically controlled oscillator NCO_P, a stored sine and cosine table INT_P producing a complex signal whose argument is the phase produced by the oscillator NCO_P, and a first and a second multiplier MULT1 and MULT2 respectively dedicated to the signal without and with delay.

A code generation module GEN_C, operating at the frequency $F_{code}$ is regulated by a numerically controlled oscillator NCO_C, and provides the code to the two multi-correlators MULT1 and MULT2. The oscillator NCO_C also regulates the sub-sampling module SS_ECH. The two digitally controlled oscillators NCO_P and NCO_C are controlled by an electronic control unit ECU, for example regulated at 50 Hz.

Figure 2B:
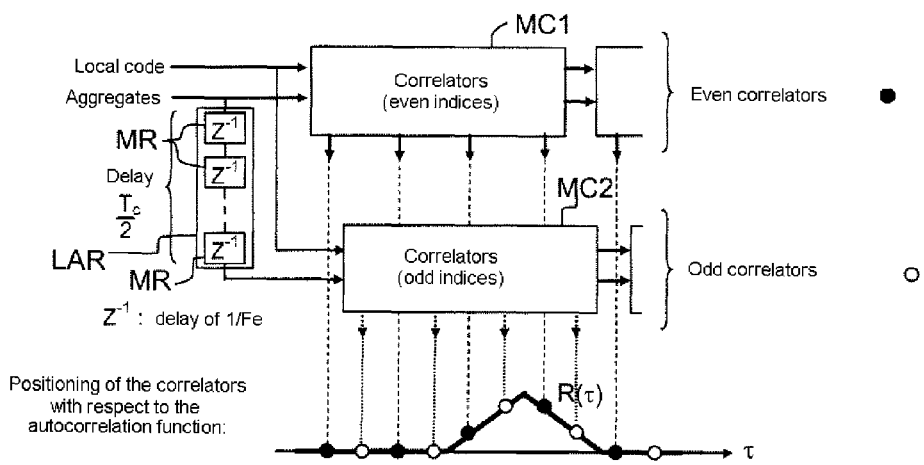

FIG. 2b illustrates more schematically the embodiment of FIG. 2a, in which the delay line LAR comprises a number of delay modules MR such that the total delay is equal to half a chip Tc/2. The positioning of the correlators with respect to the auto-correlation function R is illustrated at the bottom of the figure, with, in this instance, a spacing of half a chip between two successive correlators belonging respectively to the first and to the second multi-correlator.

The filtering module FILT makes it possible simultaneously to filter the undesirable components in the frequency band, such as interference or hostile jamming and to calculate the aggregates of the samples of the signal received. The filtering module is modulation-adapted so as to produce aggregates of samples over the duration of a modulation chip Tc.

The transfer function of the filtering module is the product of the transfer functions of the filtering template serving to attenuate the jamming and the interference, and of the amplitude spectrum of the modulation, for example BPSK modulation.

It is recalled that each satellite emits a signal consisting of a sinusoidal carrier (frequency from 1.2 to 1.6 GHz) modulated by a binary spreading code (frequency from 10 to 1 MHz), and by data bits (frequency from 1 KHz to 50 Hz) for the data pathway. A satellite emits either a data pathway alone (used much more), or a data pathway and a pilot pathway unmodulated by data bits (more usual).

The spreading sequence (period from 1 ms to 1 week) is specific to each satellite and the sequences are decorrelated between the satellites, thereby making it possible to dissociate them in the signal received, through the correlation: this is what is known as the code division multiple access (or CDMA) technique.

The waveform (temporal pattern multiplied by +1 or −1 according to the spreading sequence) is rectangular, thereby giving a triangular autocorrelation function and a squared cardinal sine power spectral density. This is what is known as BPSK modulation ("Binary Phase Shift Keying").

The filtering module may be embodied in digital or analog form.

Of course, a filtering module embodied in digital form is simpler and less expensive to embody. In the subsequent description, it is considered that the filtering module FILT is embodied in digital form, in a non-limiting manner.

The filtering module FILT can for example comprise a finite impulse response FIR filter, or an infinite impulse response IIR filter.

The filter receives the antenna signal digitized by the analog/digital converter ADC at the sampling frequency Fe. This digital signal is real and modulated at an intermediate frequency FI, for example of the order of 25 MHz. The filter produces complex aggregates σ (comprising a real part I and an imaginary part Q) at a sampling frequency Fe.

Figure 3:
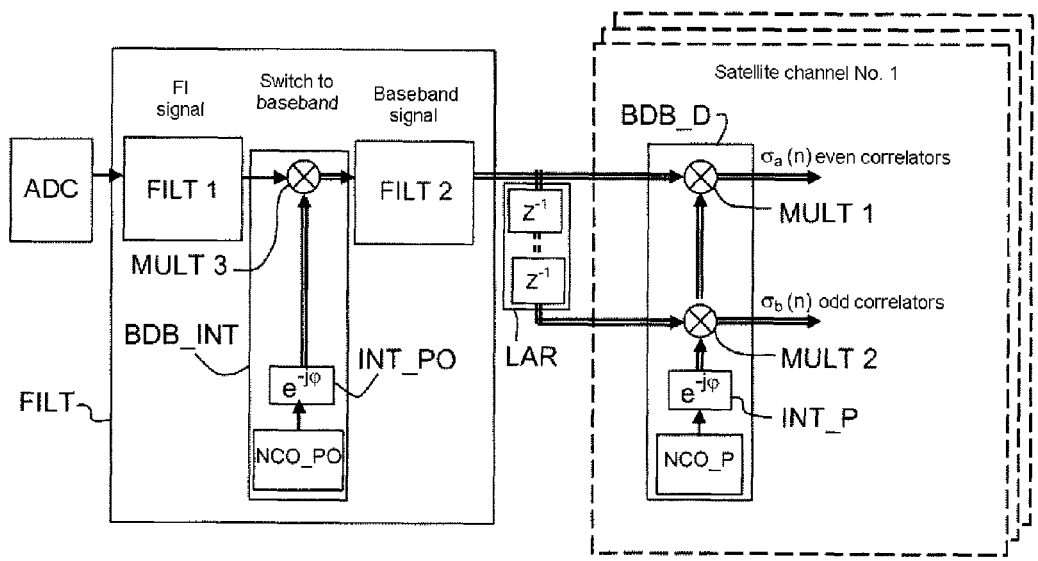
FIG. 3 schematically illustrates another embodiment according to one aspect of the invention, with two filters.

As illustrated on the example of FIG. 3, it is possible to embody the filtering module FILT in the form of a module comprising a first anti-interference filter FILT1 adapted for filtering the interference of the signal received from the satellite, a second aggregate filter FILT2 adapted for performing an aggregate of the samples of the signal received, and a module BDB_INT for demodulation at the intermediate frequency FI, so as to switch to baseband, disposed between the first and second filters FILT1 and FILT2.

In a manner analogous to the demodulation module BDB_D, the demodulation module BDB_INT comprises a carrier numerically controlled oscillator NCO_PO, a sine and cosine table INT_PO producing a complex signal whose argument is the phase produced by the oscillator NCO_PO, and a multiplier MULT3 dedicated to the signal transmitted from the first filter FILT1 to the second FILT2.

Thus, the calculations of sample aggregates are performed in baseband, after demodulation of the residual carrier at the output of the analog/digital converter ADC at the intermediate frequency FI. The switch to baseband is performed on the basis of the numerically controlled oscillator NCO_PO at the fixed frequency FI.

Figure 4:
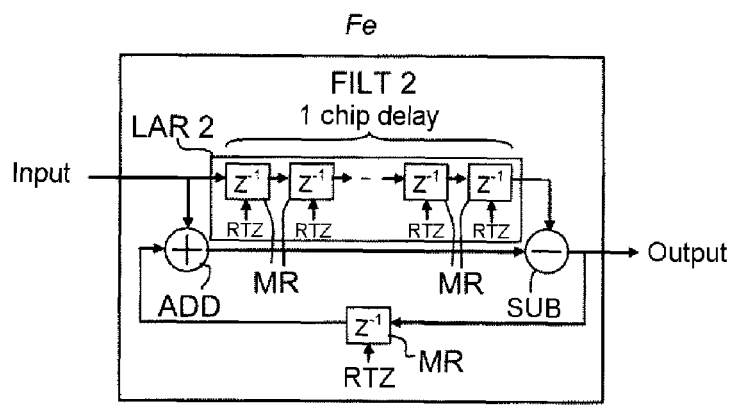
FIG. 4 illustrates an embodiment of the second filter of FIG. 3, according to one aspect of the invention.

FIG. 4 illustrates a simple and inexpensive exemplary embodiment of the second filter F2, comprising an adder ADD, a subtracter SUBT, a delay line LAR2 comprising a number N1 of delay modules disposed in series. A delay module is adapted for causing a delay equal to the sampling period $1/F_e$ of the signal emitted by the satellite, and the number N1 of delay modules MR is such that the product of N1 and of the sampling period Fe is substantially equal to said elementary duration Tc of the spreading code. Furthermore, an additional delay module MR is disposed on a feedback loop linking the output of the subtracter SUBT to the input of the adder ADD. N1+1 storage modules, not represented, are respectively associated with the N1+1 delay modules MR.

Thus, the number of coefficients of the digital filter is substantially limited, especially for an FIR filter.

Furthermore, the second filter FILT2 comprises a reinitialization module, not represented in FIG. 4, for resetting to zero the values stored in the N1+1 storage modules. This reinitialization can, for example, take place every second, and serves to avoid aggregating errors due to glitches.

Figure 5:
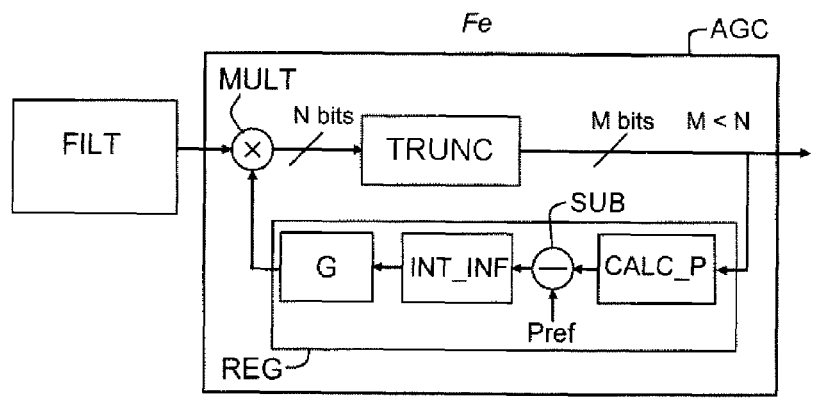
FIG. 5 schematically represents a digital automatic gain control that can be placed at the output of the filtering means, according to one aspect of the invention.

In an optional manner, the system can comprise an automatic gain control loop AGC at the output of the filtering module FILT, as illustrated in FIG. 5. The automatic gain control loop AGC comprises truncation means TRUNC for truncating the high-order and low-order bits as a function of the power of the signal at the output of the filtering module, and a feedback loop between the output of the truncation means TRUNC and a multiplier MULT disposed upstream of said truncation means TRUNC. The multiplier MULT also receives as input the output from the filtering module. The feedback loop comprises a regulating module REG for keeping the energy at the output of the truncation module TRUNC constant. The regulating module REG can comprise a power calculation module CALC_P, a subtracter SUB receiving as input the output signal from the power calculation module CALC_P and a reference power $P_{ref}$. The regulating module REG also comprises a module for infinite integration INT_INF of the output signal from the subtracter SUB, and a gain module G for applying a gain to the output signal from the infinite integration module INT_INF.

Thus, it is possible to limit the number of coding bits at the input of the satellite channels so as to limit the calculations while benefiting completely from the modulation spreading gain. This system makes it possible to tailor in an auto-adaptive manner the truncation of the high-order and low-order bits as a function of the level of the signal after the filter, which varies as a function of the type of jamming to which the signal has been subjected.

Figure 6:
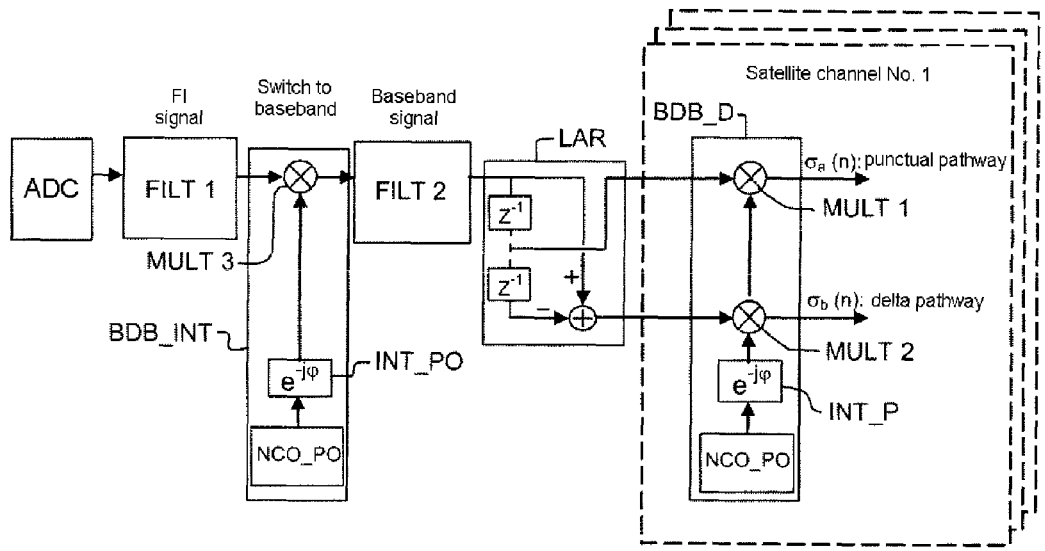
FIGS. 6 and 7 represent another embodiment of a system according to one aspect of the invention.
Figure 7:
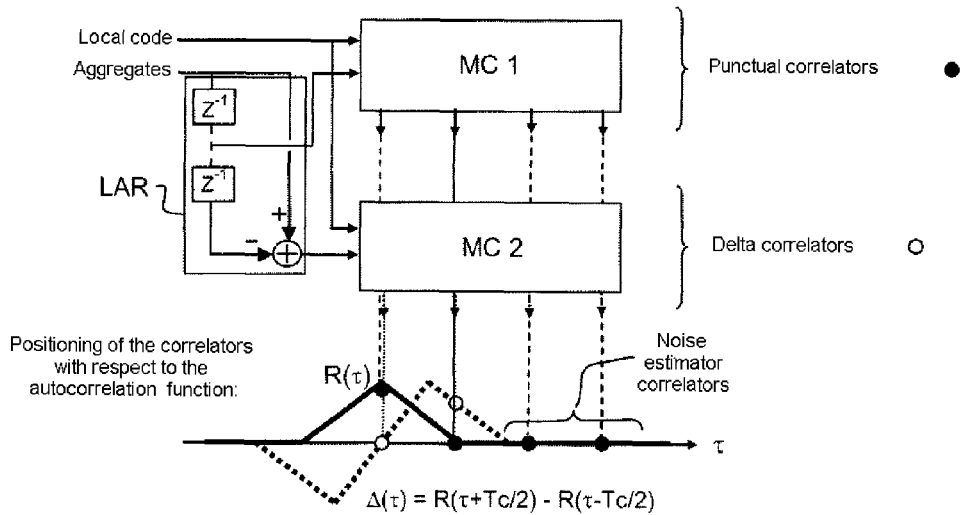

FIGS. 6 and 7 illustrate the case of a phase of tracking, the first and second pathways a and b as punctual and delta pathways. The delta pathway serves for the code loop DLL while the punctual pathway serves for the carrier loop PLL. The code loop slaves the first punctual correlator to the maximum of the auto-correlation function by canceling the first delta correlator. The other correlators can serve to estimate the noise. For these purposes, the delay line LAR is parametrizable, stated otherwise, as illustrated in the figures it is possible to parametrize the delay on each of the pathways by choosing the number of delay modules MR that are activated for each of the pathways, and to include therein a subtracter for the delta pathway.

FIG. 7 more schematically illustrates the embodiment of FIG. 6. The positioning of the correlators with respect to the auto-correlation function R is illustrated at the bottom of the figure, with, in this instance, a zero spacing between the first and the second multi-correlators, so as to make the punctual correlator coincide with the delta correlator, and thus to have the maximum of signal on the punctual correlator when the delta correlator is zero.

Figure 8:
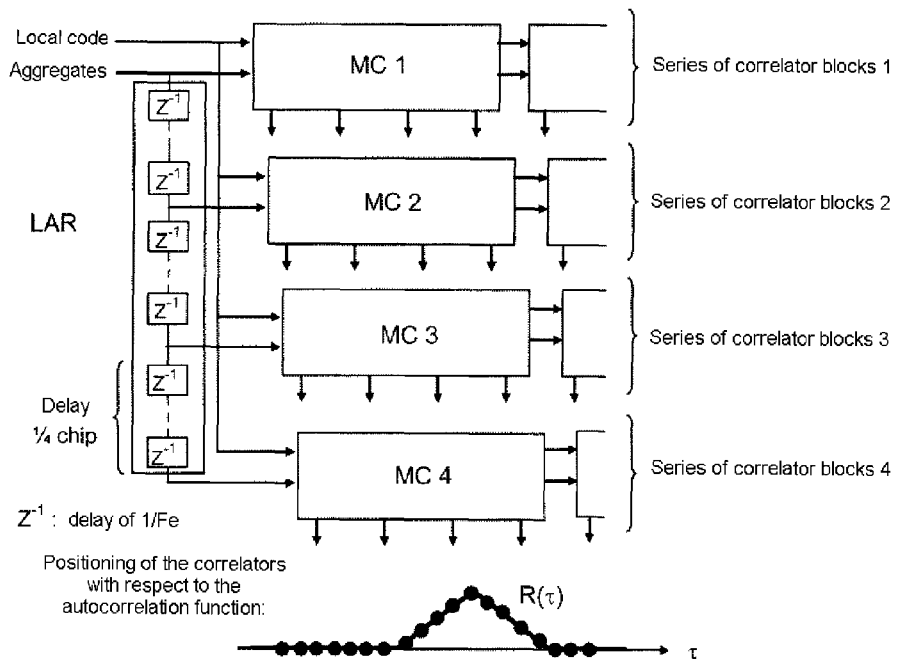
FIG. 8 illustrates another embodiment with more than two series of multi-correlator blocks, according to one aspect of the invention.

FIG. 8 illustrates an exemplary use of more than two series of multi-correlators mutually offset by fractions of chips, for example four series in parallel offset by Tc/4, makes it possible to have finer sampling of the auto-correlation function (in triangle form).

This may be useful for monitoring the quality of the signal: to detect multi-paths, interference, signal distortions due, for example, to the satellite or to the receiver.

This can also be useful for carrying out tracking in a jammed medium with non-linear processing (Bayes filter with maximum likelihood) which may demand a spacing of the multi-correlators finer than ½ a chip.

Figure 9:
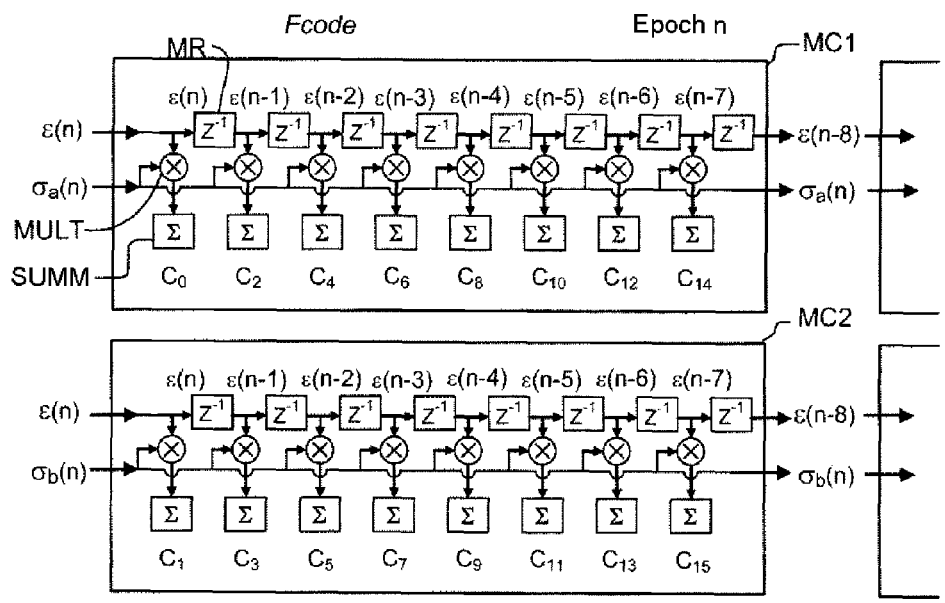
FIGS. 9 and 10 represent exemplary embodiments of the multi-correlator blocks, according to one aspect of the invention.
Figure 10:
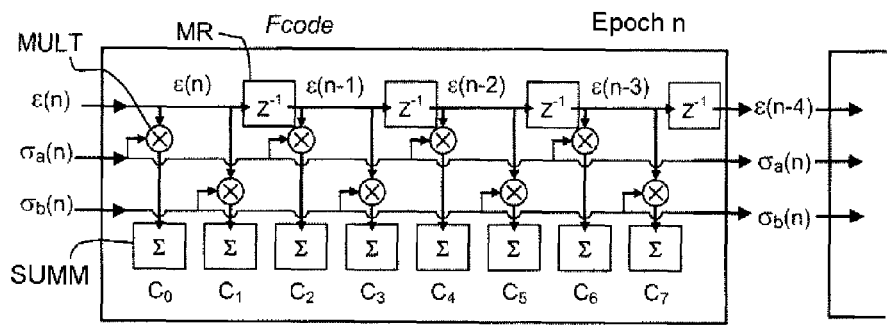

FIGS. 9 and 10 illustrate an exemplary internal embodiment of multi-correlators according to one aspect of the invention, based on delay modules MR, multipliers MULT and summators SUMM. FIG. 10 represents an architecture in which two sets of multi-correlators offset by half a chip are integrated in the same module.

Figure 11:
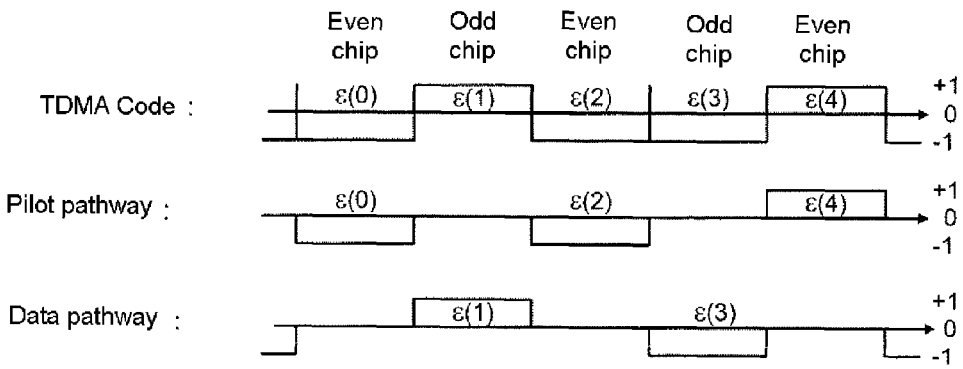
FIGS. 11, 12 and 13 schematically illustrate the case of a signal with two TDMA-multiplexed pathways, according to one aspect of the invention.
Figure 12:
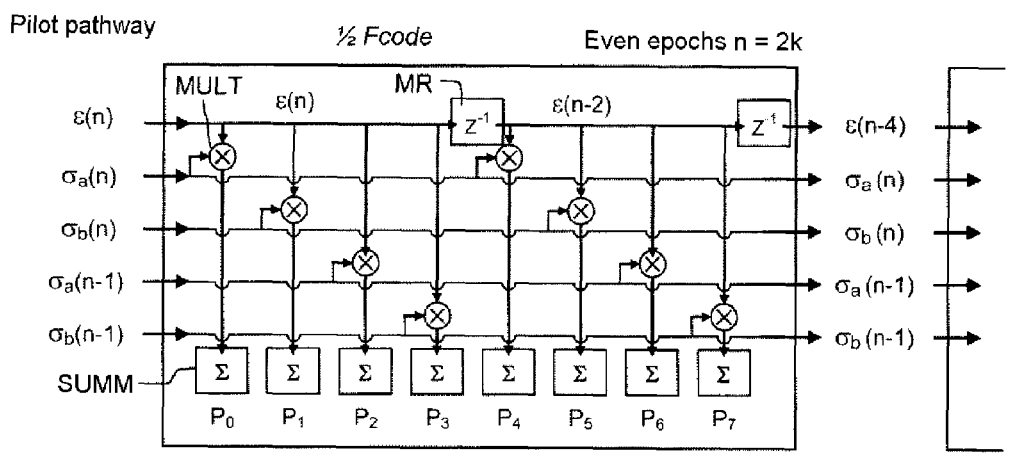
Figure 13:
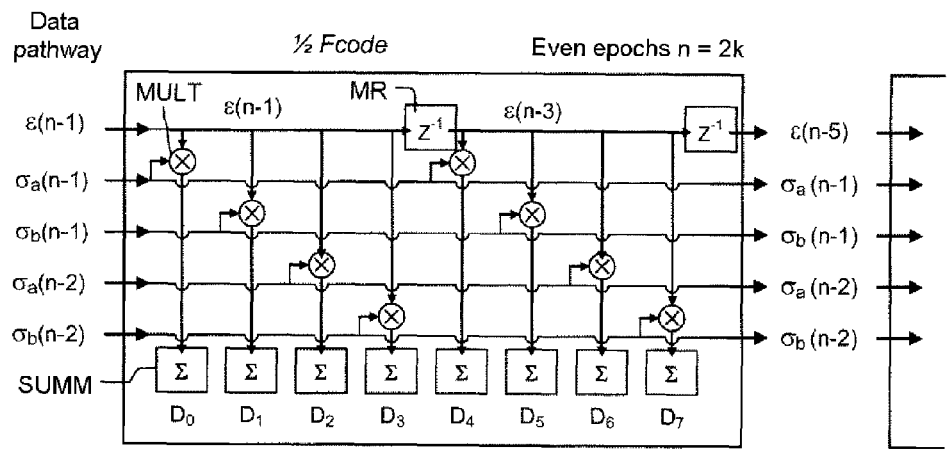

FIGS. 11, 12 and 13 illustrate the case of a signal containing two pathways, a pilot pathway and a data pathway, time division multiple access or TDMA multiplexed. Thus, it is possible to divide the working frequency by two ($F_{code}/2$).

FIG. 11 illustrates the apportioning of one chip out of two alternately in the spreading code for the data pathway and the pilot pathway. The code throughput is thus divided by two on each pathway, as illustrated in FIGS. 12 and 13.

Figure 13A:
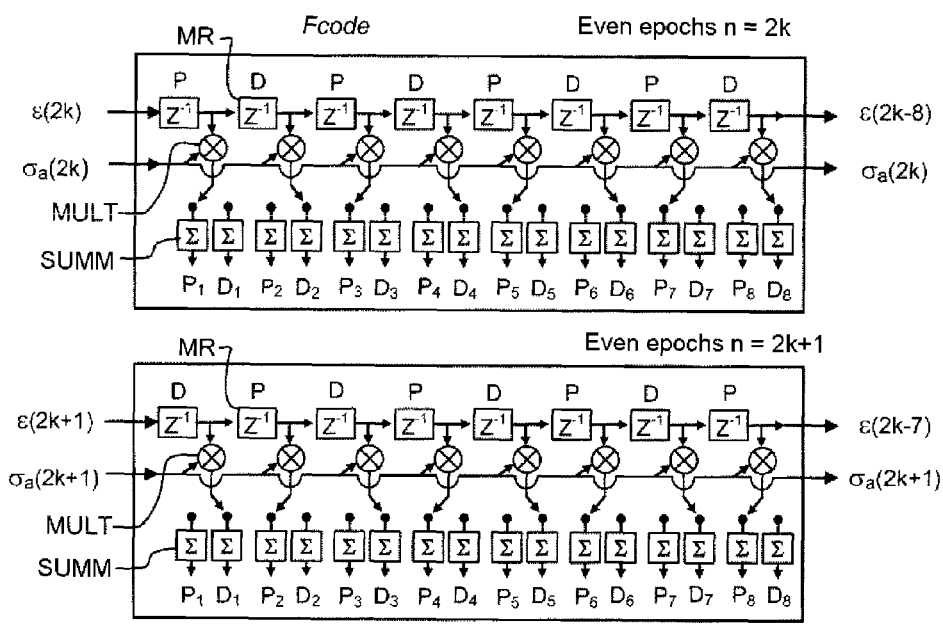
FIG. 13a represents a variant embodiment of FIGS. 11, 12 and 13.

As a variant, such as illustrated in FIG. 13a, it is possible to group together the correlators of the pilot pathway and the correlators of the data pathway in one and the same multi-correlator block, operating at the frequency $F_{code}$. Thus the summation operators may be multiplexed between the integrators for the pilot pathway and the integrators for the data pathway, according to the even or odd epochs (i.e. even or odd chip ϵ(n)). The same gain is obtained as previously, but organized differently.

In the case of a signal of BOC type the two lobes may be demodulated separately. Certain navigation systems use BOC signals consisting of a radio frequency carrier, a square sub-carrier and a spreading code. The waveform (temporal pattern multiplied by +1 or −1 according to the spreading sequence) is sine-like (notches), thereby giving a power spectral density with two main lobes and an autocorrelation function with multiple peaks. The aim of this modulation is two-fold: to free the spectrum between the two lobes for other already existing signals, and to improve the precision of the measurements in the presence of thermal noise and multi-paths.

Hence, the two lobes are demodulated separately, by considering each lobe as a fully-fledged BPSK signal, with a carrier offset with respect to the central frequency (by a quantity equal to the sub-carrier frequency or its opposite).

Figure 14A:
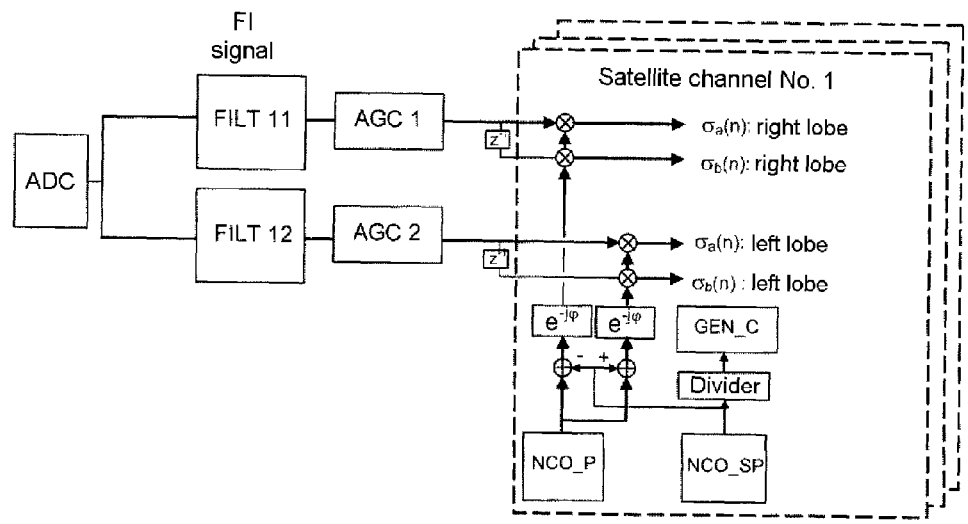
FIGS. 14a, 14b and 14c illustrate the case of a BOC signal with separate demodulation of the two lobes of the signal.

Hence, in the case of a BOC signal, in the search phase the energies of the two lobes are summed in a non-coherent manner. In the tracking phase a coherent processing of the two lobes at the output of the correlators is performed. For these purposes, such as illustrated in FIG. 14a, two digital filters are produced on each lobe with distinct passbands so as to preserve one lobe if one of the two lobes is jammed.

The switch to baseband and the demodulation of the Doppler effect in the channel uses a local carrier NCO_P offset to the left and one offset to the right. The two carriers are produced by virtue of the carrier numerically controlled oscillator NCO_P producing a phase at the intermediate frequency plus the Doppler correction of the PLL, and by virtue of the sub-carrier numerically controlled oscillator NCO_SP producing a phase at the sub-carrier frequency plus the Doppler correction of the DLL (referred to carrier frequency). The sub-carrier oscillator NCO_SP also replaces the code oscillator NCO_C and serves to generate the local code and for the sub-sampling of the channel. This architecture makes it possible to retain the coherence between the code delay and the phase offset between the two lobes, useful for the coherent tracking of the two lobes. The two automatic gain control loops AGC1 and AGC2 make it possible to adapt the truncation of the bits which enter the channel as a function of the jamming level which may differ from one lobe to the other.

Figure 14B:
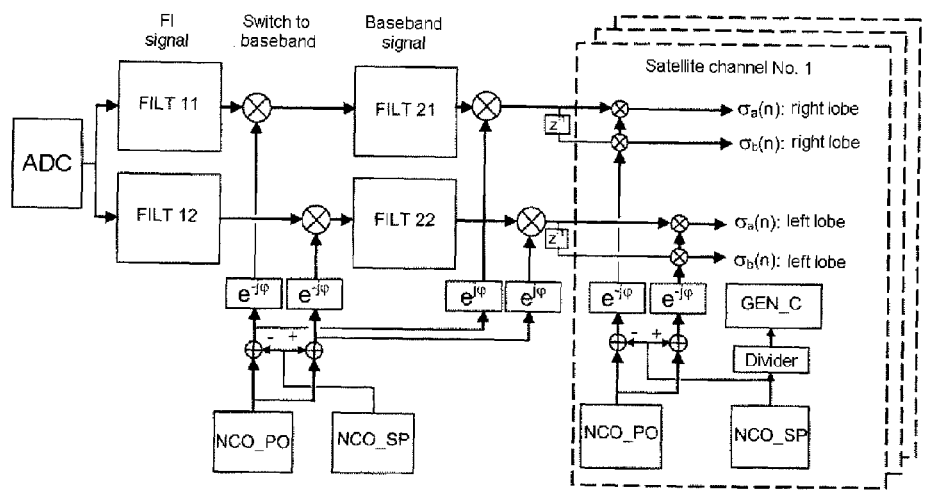

As illustrated in FIG. 14b, it is possible to use a sliding-window aggregate. To effect the switch to baseband on each lobe before the sliding-window aggregate filters it is necessary to demodulate the intermediate frequency offset by the carrier frequency or by the opposite of the carrier frequency.

To keep the same architecture of the channels as previously, we switch back to intermediate frequency offset by the carrier frequency or by the opposite of the carrier frequency after the calculation of the aggregates.

Figure 14C:
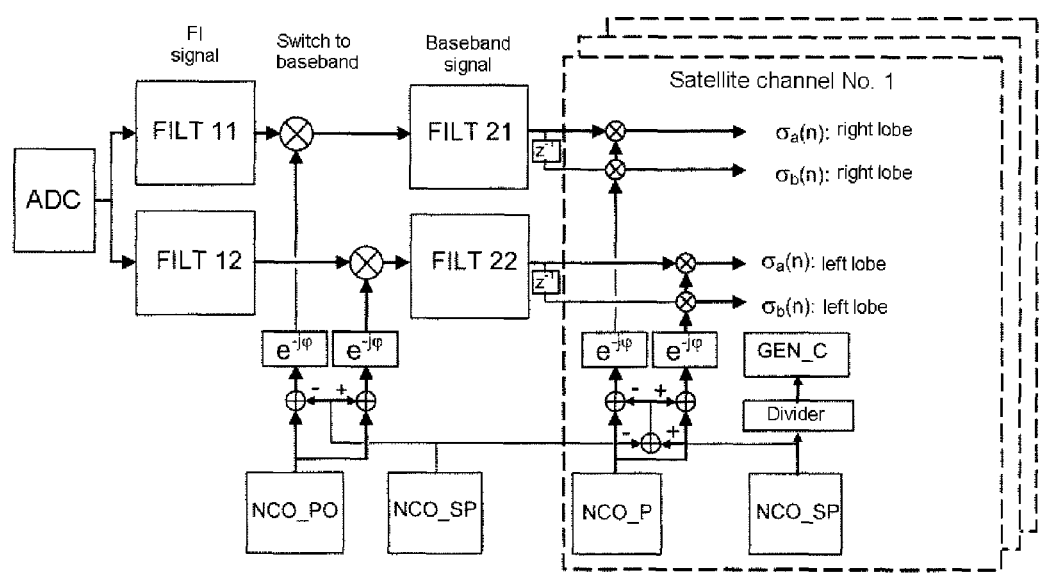

FIG. 14c represents a simplification, avoiding reverting to intermediate frequency after the aggregates. In this case the frequency of the carrier numerically controlled oscillator NCO_P of the channel reduces to the residual Doppler.

Two FIR filters are produced on each lobe, the filters FILT11 and FILT21 for the right lobe and the filters FILT12 and FILT22 for the left lobe with distinct passbands so as to preserve one lobe if one of the two lobes is jammed. In order to preserve the coherence between the delay of the code and the phase offset between the two lobes, the sub-carrier phase of the channel is corrected with the sub-carrier phase NCO_SP used for the switch to baseband before the channels.

The invention can be applied to any radionavigation system, and notably those for which the sampling frequency is high relative to the code frequency.

The invention claimed is:

1. A system for receiving a radionavigation signal, notably in a jammed medium, emitted by a satellite of a satellite positioning system, the system comprising:

at least one first multi-correlator and at least one second multi-correlator disposed in parallel and operating respectively at a frequency $F_{code}$ generated by a numerically controlled oscillator, the offset between the sequences of correlations of two successive correlators of one and the same multi-correlator being equal to an elementary duration Tc of the spreading code, during which the value of the spreading code is constant;

filtering means, disposed upstream of said multi-correlators, of impulse response substantially equal to the waveform of the signal emitted by the satellite making it possible to perform an aggregate of the samples of the signal received, operating at the sampling frequency $F_e$ of the signal emitted by the satellite for the set of reception channels, and delivering as output a filtered signal destined for the first multi-correlator and destined for the second multi-correlator by branching;

a delay line, disposed on the branch, between said filtering means and said second multi-correlator, comprising a set of delay modules with controlled individual activation/deactivation, disposed in series, a delay module being adapted for causing a delay of a sampling period of the signal emitted by the satellite equal to the inverse of the sampling frequency $F_e$;

means for sub-sampling at the frequency $F_{code}$ and adapted for sub-sampling the signal transmitted directly and by branching with delay by said filtering means; and demodulation means for eliminating the Doppler effect, disposed between said sub-sampling means and said first and second multi-correlators.

2. The system as claimed in claim 1, wherein said filtering means comprises at least one analog filter.

3. The system as claimed in claim 1, wherein said filtering means comprises at least one digital filter.

4. The system as claimed in claim 3, wherein said digital filter comprises a finite impulse response filter, or an infinite impulse response filter.

5. The system as claimed in claim 1, wherein said filtering means comprises a first anti-interference filter adapted for filtering the interference of the signal received from the satellite, a second sliding-window aggregate filter adapted for performing an aggregate of the samples of the signal received, and means of demodulation at an intermediate frequency FI, for switching to baseband, disposed between said first and second filters.

6. The system as claimed in claim 4, wherein said second sliding-window aggregate filter comprises an adder, a subtracter, a delay line comprising a number N1 of delay modules disposed in series, a delay module being adapted for causing a delay of a sampling period of the signal emitted by the satellite, the number N1 of delay modules being such that the product of N1 and of said sampling period is substantially equal to said elementary duration Tc of the spreading code, a delay module adapted for causing a delay of a sampling period of the signal emitted by the satellite, disposed on a feedback loop from the output of the subtracter to the input of the adder, and N1+1 storage modules respectively associated with the delay modules.

7. The system as claimed in claim 5, wherein said second sliding-window aggregate filter further comprises reinitialization means for resetting to zero the values stored in said N1+1 storage modules.

8. The system as claimed in claim 1, further comprising an automatic gain control loop disposed directly at the output of said filtering means.

9. The system as claimed in claim 8, wherein said automatic gain control loop comprises truncation means for truncating the high-order and low-order bits as a function of the power of the signal at the output of said filtering means, and a feedback loop between the output of the truncation means and a multiplier disposed upstream of said truncation means and also receiving as input the output from said filtering means, said feedback loop comprising regulating means for keeping the energy at the output of said truncation means constant.

10. The system as claimed in claim 9, wherein said regulating means comprises power calculation means, a subtracter receiving as input the output signal from said power calculation means and a reference power ($P_{ref}$), means of infinite integration (INT_INF) of the output signal of said subtracter, and gain means for applying a gain to the output signal from said means of infinite integration.

\* \* \* \* \*

UNITED STATES PATENT AND TRADEMARK OFFICE
CERTIFICATE OF CORRECTION

PATENT NO. : 8,681,042 B2  Page 1 of 1
APPLICATION NO. : 12/993897
DATED : March 25, 2014
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 569 days.

Signed and Sealed this

Twenty-ninth Day of September, 2015

Michelle K. Lee
*Director of the United States Patent and Trademark Office*